United States Patent
Stiesdal

(10) Patent No.: US 8,075,277 B2
(45) Date of Patent: Dec. 13, 2011

(54) METHOD FOR CASTING A COMPONENT AND A COMPONENT COMPRISING AT LEAST PARTLY OF FIBRE-REINFORCED PLASTIC LAMINATE

(75) Inventor: Henrik Stiesdal, Odense C. (DK)

(73) Assignee: Siemens Aktiengesellschaft, Munich (DE)

( * ) Notice: Subject to any disclaimer, the term of this patent is extended or adjusted under 35 U.S.C. 154(b) by 1192 days.

(21) Appl. No.: 11/803,375

(22) Filed: May 14, 2007

(65) Prior Publication Data

US 2007/0274835 A1    Nov. 29, 2007

(30) Foreign Application Priority Data

May 26, 2006 (EP) ..................... 06010921

(51) Int. Cl.
*B29C 70/36* (2006.01)
(52) U.S. Cl. .................... 416/230; 416/241 A
(58) Field of Classification Search .............. 416/229 R, 416/230, 231 R, 241 A
See application file for complete search history.

(56) References Cited

U.S. PATENT DOCUMENTS

| | | | |
|---|---|---|---|
| 5,304,339 A | 4/1994 | Le Comte | |
| 5,665,301 A | 9/1997 | Alanko | |
| 6,818,159 B2 | 11/2004 | Hinz | |
| 6,843,953 B2 | 1/2005 | Filsinger et al. | |

FOREIGN PATENT DOCUMENTS

| | | |
|---|---|---|
| DE | 198 13 105 A1 | 9/1999 |
| EP | 1 181 149 B1 | 2/2002 |
| EP | 1 310 351 A1 | 5/2003 |

*Primary Examiner* — Christopher Verdier
*Assistant Examiner* — Jesse Prager

(57) ABSTRACT

There is described a method for casting a component comprising at least partly of fiber-reinforced plastic laminate by which the fiber-reinforcement is arranged in a casting mould, wherein at least one venting duct is placed, wherein said fiber-reinforcement and said venting duct are at least partly wetted by the plastic during the casting process in such a way that venting is achieved through said venting duct, and wherein the surface of the venting duct is at least partially made with a semi-permeable membrane that allows the passage of gases but does not allow or only slowly allows the passage of plastics. Furthermore there is described a component comprising at least partly of fiber-reinforced plastic laminate, wherein the plastic laminate inside comprises of one or more venting ducts, wherein the surface of a venting duct is at least partially made with a semi-permeable membrane that allows the passage of gases but does not allow or only slowly allows the passage of plastics.

14 Claims, 2 Drawing Sheets

METHOD FOR CASTING A COMPONENT AND A COMPONENT COMPRISING AT LEAST PARTLY OF FIBRE-REINFORCED PLASTIC LAMINATE

CROSS REFERENCE TO RELATED APPLICATIONS

This application claims priority of European application No. 06010921.2 EP filed May 26, 2006, which is incorporated by reference herein in its entirety.

FIELD OF INVENTION

The invention relates to a method for casting a component comprising at least partly of fibre-reinforced plastic laminate wherein the fibre-reinforcement is at least partly wetted by the plastic laminate, as well as to a component comprising at least partly of fibre-reinforced plastic laminate.

BACKGROUND OF INVENTION

Such methods are used to produce fibre-reinforced plastic laminates where hand lay-up or filament winding is undesirable. The fibre reinforcement can be of any known type, such as chop stand or woven fabric mats, multi-axis interlaid scrims, warp-thread reinforced unidirectional performs, single or joined roving bundles, and of any known material, such as glass, Kevlar, carbon or hemp. The fibre reinforcement may be supplemented with pre-fabricated components, such as fibreglass inserts, pultruded rods, etc. and with sandwich core materials such as balsa wood, foam or honeycomb. The plastic or matrix material may be a thermosetting plastic, such as polyester, vinylester, epoxy, etc., or it may be a thermoplastic, such as polyethylene, polypropylene, PVC, ABS, etc. The plastic laminate may be introduced after the completion of the lay-up of the fibre reinforcement, or it may be integrated with the fibre-reinforcement during lay-up, e.g. in the so-called prepreg materials where the fibre-reinforcement is pre-wetted with the plastic laminate in a non-cured but comparatively solid form that can be handled manually and can be cured once in place, or as a thermoplastic interwoven with or laid up along the fibre-reinforcement.

One such method is resin infusion, where fibre-reinforcement is laid up dry in one mould part, another flexible mould part is added following completion of lay-up so as to form a closed mould around the fibre-reinforcement, the mould is evacuated to achieve good consolidation of the fibre-reinforcement under atmospheric pressure, a liquid matrix material is infused to completely fill in all voids between the reinforcement fibres and between the fibres and the mould parts, and after completion of the injection the matrix material is cured, typically by the application of heat to form the completed composite laminate.

In another such method the fibre-reinforcement is manufactured as a combination material where the fibres are interwoven with or surrounded by a thermoplastic. This combination material is laid up dry in one mould part, another flexible mould part is added following completion of lay-up so as to form a closed mould around the fibre-reinforcement, the mould is evacuated to achieve good consolidation of the fibre-reinforcement under atmospheric pressure, and the combination material is heated above the melting point of the thermoplastic, whereby the now liquid thermoplastic completely fill in all voids between the reinforcement fibres and between the fibres and the mould parts, and after completion of this liquid phase the material is again cooled to form the completed composite laminate.

In most of such methods it can be a problem that air can get trapped in the laminate. Air may be trapped in high points due to buoyancy, but it may also be trapped in parts of the laminate where gravity would be expected to assist in the replacement of the air with the matrix material. Such trapping of air may be caused by geometrical conditions or by the reaction during the curing process, e.g. chemical separation or volatile components.

The problem of potential air entrapment has mainly been solved until now by limiting manufacturing to components that can be viewed through a transparent vacuum bag during the process and where the location of air vents in the vacuum bag can be adjusted as a result of observations. This method does not work, however, when manufacturing large structures with partially or completely closed spaces that cannot be accessed during manufacturing.

Various methods have been suggested to reduce the problem of trapped air in laminates.

Document DE 198 13 105 A1 describes a method where the venting area of a breather hole can be expanded with a semi-permeable membrane. Whilst this method can extend the active area of a suction vent, the effect cannot be ensured if one does not know the location of air inclusions. Furthermore, if the vent is placed on an external surface it requires substantial finishing works after moulded.

Document EP 1 181 149 describes a method whereby the entire vacuum bag surface comprises a semi-permeable membrane. This method will remove air from the laminate surface irrespective of where entrapment occurs, but it has the great disadvantage that if the mould surface is on the up side and the vacuum bag surface is on the down side, there is still a large risk of air inclusions close to the surface next to the mould. Due to buoyancy air will tend to move upwards, away from the venting membrane. The method described in EP 1 181 149 also has the disadvantage that it requires the entire surface of one side of the laminate to be covered by costly supplementary materials such as flow-assisting vacuum bags or semi-permeable membranes. Furthermore, for elongated, partially closed structures the removal of the supplementary materials after curing of the laminate may be difficult or impossible, and the supplementary materials may need to be left in place, which in turn could lead to problems over time with accumulation of condensation etc. in voids between the supplementary materials and the laminate.

In U.S. Pat. No. 5,665,301 a method is disclosed for manufacturing a fiber reinforced composite article. A vacuum is connected to the fiber reinforcement in a mold via multiple peripheral self sealing micro porous conduits passing between a vacuum chamber and the mold cavity containing the fiber reinforcement for the article. Resin is injected in the mold. The resin flow moves toward the peripheral self sealing micro porous conduits allowing any residual air or volatiles remaining in the dry fiber reinforcement, due to imperfect vacuum, to be drawn out through the peripheral self sealing micro porous conduits into the peripheral vacuum chamber and exhausted through the vacuum pump.

U.S. Pat. No. 5,304,339 discloses a method of manufacturing a large-sized, thin-walled, elongated molding of fiber reinforced, hardenable synthetic resin where at least one layer of reinforcing fiber is laid against a form-retaining, rigid inner mold part. A flexible outer mold part is placed against the fiber layer. A liquid, hardenable synthetic resin is flowed into the mold cavity to substantially fill the mold cavity. A reduced pressure is induced within the mold cavity to cause the flexible mold part to be tightly drawn against the fiber layer and toward the inner mold part, air to be removed from within the resin, mold cavity and fiber layer and to cause the resin to flow into the fiber layer and mold cavity. Multi-channeled cores may be placed in the so-formed mold cavity to improve the uniformity of resin distribution.

SUMMARY OF INVENTION

It is thus an aim of the invention to disclose a method for casting components which reduces or eliminates the risk of air inclusions in the components manufactured as composite laminates in particular fibre-reinforced plastic laminates without the disadvantages of the known methods. It is a further aim of the invention to disclose a component with at least reduced air inclusions.

This aim according to the method is met with a method for casting a component comprising at least partly of fibre-reinforced plastic laminate, wherein the fibre-reinforcement is arranged in a casting mould, wherein at least one venting duct is placed, wherein said fibre-reinforcement and said venting duct are at least partly wetted by the plastic during the casting process, in such a way that venting is achieved through said venting duct, and wherein the surface of the venting duct is at least partially made with a semi-permeable membrane that allows the passage of gases but does not allow or only slowly allows the passage of plastic.

By the method of the invention, at least one venting duct is placed inside or upside the fibre-reinforcement. After this, the fibre-reinforcement and the venting duct are partly wetted by the plastic laminate. By wetting with the plastic laminate according to the prior art air inclusions often arise inside the plastic laminate because air cannot completely discharge from the plastic laminate, such trapping of air caused e.g. by geometrical conditions or by the reaction during the curing process, e.g. chemical separation or volatile components. In the invention such trapped air is vented to the outside of the plastic laminate by the venting duct. Trapped air is sucked into the venting duct by passage through the venting duct e.g. a semi-permeable membrane or some other device that allows the passage of gases but does not or does only very slowly allow the passage of resins or thermoplastics. By this the venting duct fundamentally remains free of plastic material. That means, because of the venting duct inside the plastic laminate, it does not stop venting despite being wetted on the outside. Therefore a reduction or elimination of air inclusions is achieved.

The method of venting trapped air through ducts placed inside the laminate has several great advantages compared with known methods.

The venting ducts can be placed stretching from regions where air entrapment occurs and to regions where venting to external breather ducts is facilitated. A series of venting ducts can be installed in a large structure, all leading to one or more areas of external breathers.

By ensuring venting inside the laminate, requiring only one or a few external breather locations for even very large structures the surface finishing requirements can be greatly reduced.

The venting ducts can be placed at any depth in the laminate, from top to bottom, ensuring proper venting irrespective of the depth inside the laminate where air entrapment occurs.

The venting ducts may be of varying size in a given structure, depending on the amount of air to remove from different locations in the structure.

As a result large components for example windmill rotor blades can easily be manufacture in one piece and without any or large air inclusions.

In a preferred embodiment the fibre-reinforced plastic laminate comprises of an upper surface and a lower surface and at least one venting duct is located close to the upper surface. This means that at least one venting duct is located at that point where buoyancy tends to locate entrapped air.

The aim according to the component is met with a component comprising at least partly of fibre-reinforced plastic laminate, wherein one or more venting ducts are placed inside the plastic laminate and wherein the surface of a venting duct is at least partially made with a semi-permeable membrane that allows the passage of gases but does not allow or only slowly allows the passage of plastics. As a result the advantages of the method can also be applied to the component.

Preferred at least one venting duct is in form of a breather filter. A preferred size is a width of 5-50 mm. Thereby it is particular easy to manufacture the venting duct in endless lengths, for example for large components.

Preferred at least one venting duct comprises of two layers of a semi permeable membrane with a breather inside. This breather can be for example a non-woven thermoplastic which provides almost unrestricted passage of air and is low-prized. Due to the semi permeable membrane the venting duct does not stop venting despite being wetted on the outside on large areas of no air entrapment. Consequently, entrapped air reaching the surface of the venting duct is efficiently transferred to a location of an external breather.

In a preferred embodiment at least one venting duct comprises of a strip of material that has a resinophobic outer surface structure. This allows air to pass along the structure without actually entering the venting duct. Such resinophobic structure could be longitudinal microgrooves in a convoluted cross-sectional shape of thermoplastic. Air can enter the lower depths of the grooves, but resin cannot. Consequently, due to the resinophobic surface the venting duct will continue to vent despite being wetted on the outside.

Preferred at least two venting ducts are placed parallel and spaced. Since a venting duct with a semipermeable or resinophobic external surface essentially represents a delamination risk inside the plastic laminate, the application as a series of parallel ducts placed with some distance is of great advantage. This limits the effects of local delamination and minimises the risk of a large delamination of structural consequence.

In a preferred embodiment at last one venting duct ends in one or more manifolds. Furthermore the manifolds are preferred connected to one or more external air breathers. The air extraction is advantageously in the vacuum bag or the mould, in which the casting takes place. It may also end simply with an open end at a high point inside the plastic laminate close to one or more external breather vents.

The invention allows therefore the placing of venting ducts at the locations needed, also out towards mould surfaces, without introducing need for finish due to air vents in mould surfaces. It also uses much less volume of expensive semi permeable membrane than disclosed in prior art.

Preferably the method as well as the component is used for making rotor blades in particular for windmills. Thereby the component self can be the rotor blade.

BRIEF DESCRIPTION OF THE DRAWINGS

The invention will in the following be explained in more detail with reference to the drawings, where.

DETAILED DESCRIPTION OF INVENTION

Figure 1:
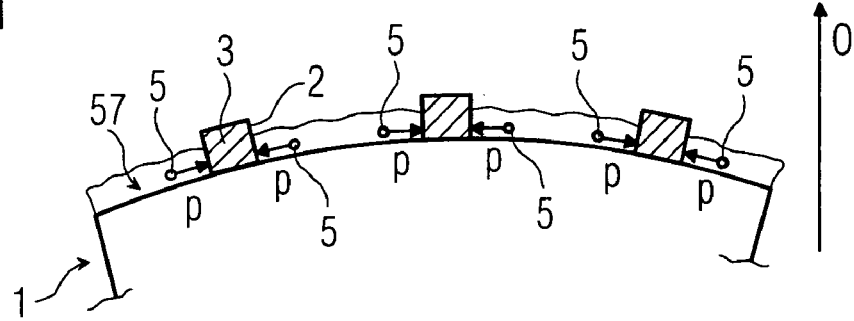
FIG. 1: shows schematically the fibre-reinforcement with the venting ducts partly wetted, according to the invention (lateral cut through the device during casting)

FIG. 1 shows schematically an embodiment of the fibre-reinforcement 1. Inside the fibre-reinforcement 1 several venting ducts 2 are laid up. The venting duct comprises a breather filter 3. During the casting process the fibre-reinforcement 1 is wetted by the plastic laminate 57. Now air inclusions 5 arise by for example, different curing of the plastic laminate 57. By the invention the air 5 passes, indicated in FIG. 1 with p, through the outer surface of the venting ducts 2. The air is now inside the venting duct 2 that is in the breather filter 3. As a result of the material of the venting ducts 2 only the air is allow to pass through. The plastic laminate 57 itself can not pass through. Therefore the air is leaded by the breather filter 3 inside the venting ducts 2 to the outside. This is shown by the arrow o. Hence, the air in the air inclusions 5 can discharge by the venting ducts 2. By this air inclusions are eliminated or reduced.

Figure 3:
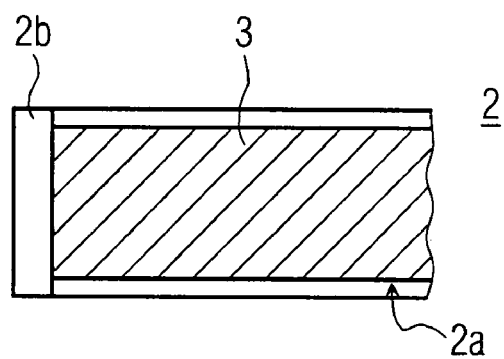
FIG. 3: shows schematically a venting duct, in the form of a breather filter (top view)

FIG. 3 shows schematically an embodiment of a venting duct 2 with a breather filter 3. The venting duct 2 consists of an outer surface 2a and an outer surface 2b which both are impermeable with regard to the plastic laminate 57 but permeable with regard to the air.

Figure 2:
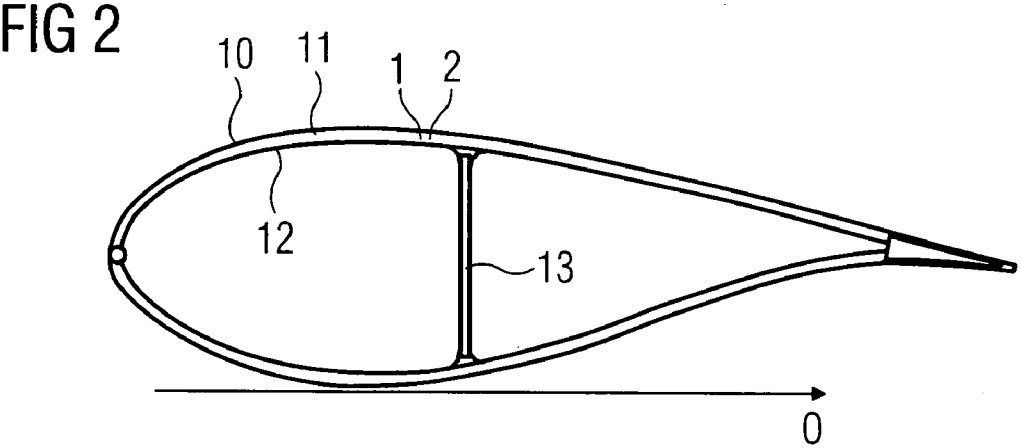
FIG. 2: shows schematically a rotor blade with the fibre-reinforcement and the venting ducts wetted with the plastic laminate, according to the invention (longitudinal cut through the rotor blade)

FIG. 2 shows a manufactured rotor blade 7 with the fibre-reinforcement 1 and the venting ducts 2 completely wetted by the plastic laminate 57. The rotor blade is an integrated unit, which comprises an outer shell 10, a sandwich core 11, an inner shell 12 and a shear web 13. Inside the sandwich core there is the fibre-reinforcement 1 and the venting ducts 2. In other embodiments the rotor blade may be made with plural shear webs or completely without webs.

Figure 4:
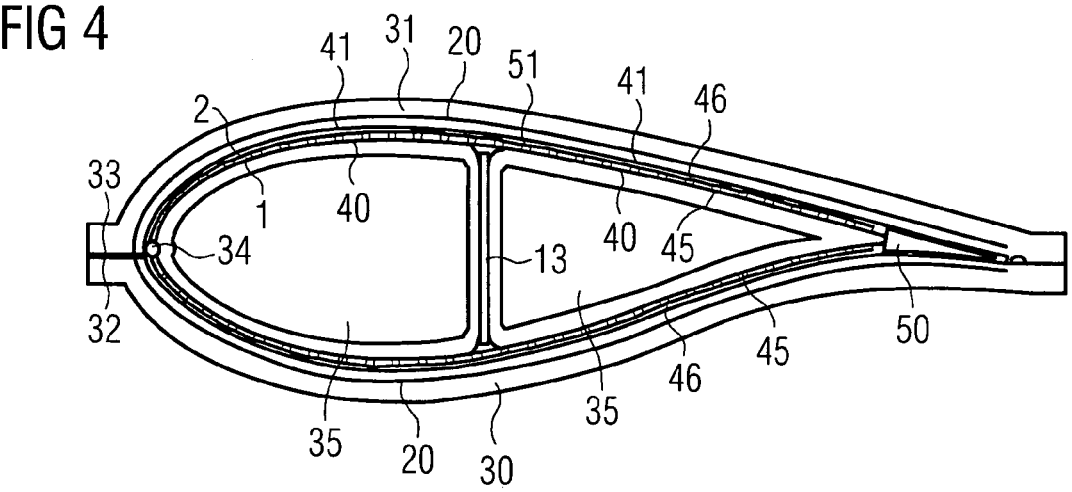
FIG. 4: shows schematically a rotor blade according to the invention, (longitudinal cut through the rotor blade)

FIG. 4 shows schematically the method of the casting process according to the invention. A mould part 30 and a corresponding mould part 31, which closure edges 32, 33 are made as a negative impression of a part of the external surfaces of the rotor blade 7. At one or more suitable places, here for example at the closure edge 32 a flow pipe 34 is provided. A temperature regulating system 20 may be active during the whole or a part of the injection process, and particularly after finished injection it may be used to bring the injected laminated up to a temperature that enhances the setting process. Depending on the embodiment, the temperature regulating system may also be used for cooling mould and laminate, if the exothermic heat of the setting process is in danger of raising the temperature of mould and laminate to an undesired level. However, one may also completely omit a temperature regulating system in the mould and perform possible final setting in a separate process afterwards. Inside the mould parts one or more core parts 35 and a possible shear web 13 are arranged. The core parts 35 are at least partly wrapped by a flexible membrane 40. Between flexible membrane 40 and core parts 35 could be arranged other material (not shown) e.g. fibre material. Upon the membrane 40 a fibre-reinforcement 1 is laid up. Upon the fibre-reinforcement 1 the venting ducts 2 are laid up in particular parallel and spaced. Furthermore some of the venting ducts could be possibly arranged inside the fibre-reinforcement 1. Also some venting ducts 2 can be laid up nearby the outer surface of the rotor blade, by which they can effectively lead the buoyancy air to the outside.

Between on the one hand the mould parts 30 and 31 and on the other hand the flexible membrane 40 around the mould core 35 there is a cavity 51. This cavity 51 is partly filled by the fibre-reinforcement 1. This fibre-reinforcement 1 comprises maybe of several layers of core material 45 and/or several layers of fibre materials 46 e.g. mats as well as other core parts 50. Now vacuum is applied to the cavity 51 so that at least a substantial part of the air staying in the fibre-reinforcement 1 and in the cavity 51 is evacuated. Thereby the fibre-reinforcement 1 and the venting ducts 2 are compressed in the cavity 51 as the membrane 40 expands.

Figure 5:
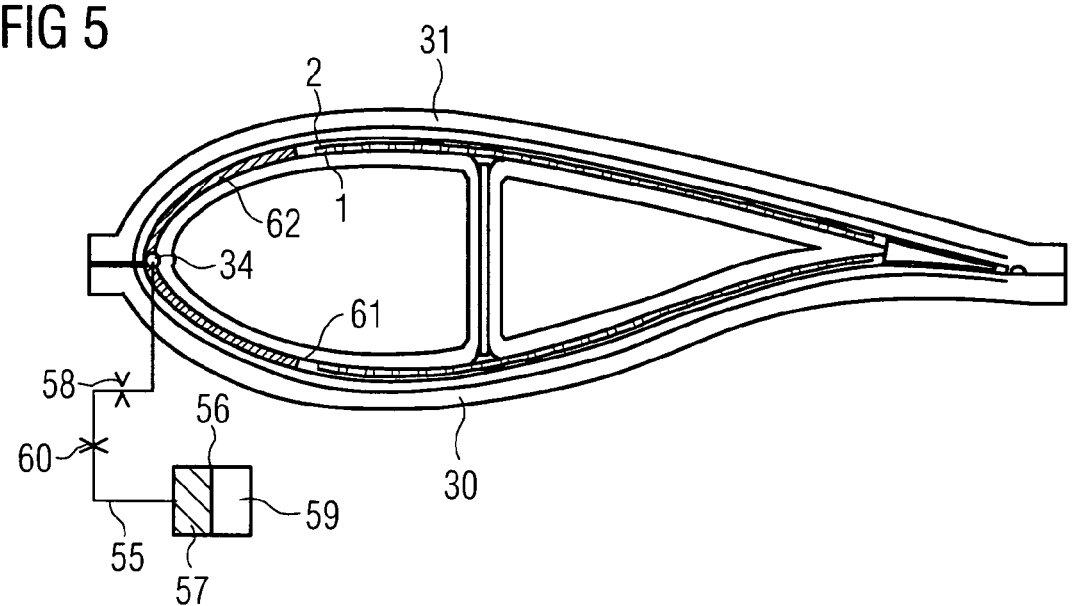
FIG. 5: shows schematically the method according to the invention (longitudinal cut through rotor blade and moulds during casting)

FIG. 5 shows the next step in making the rotor blade according to the invention. A connection 55 is established between the flow pipe 34 and a reservoir 56 with plastic laminate 57 for example suitable plastic laminate 57 with the right mix ratio, e.g. resin comprises polyester, vinyl ester or epoxy. The connection 55 that may be a pipe or a tube or combinations thereof, may be provided with a variable flow control valve 58, or in other ways there may be established means for controlling the flow rate in connection 55 to the flow pipe 34, e.g. in the form of pressure control of the space 59 over the plastic laminate 57. The connection 55 may be provided with a stop cock 60, or in other ways there may be established possibility of blocking the flow from the reservoir 56 through the connection 55, e.g. by the flow control valve 58 being able to shut the connection off completely. This is opened up for the flow in the connection 55, and injection is commenced as the plastic laminate flows into the cavity 51 under action of the pressure difference between the vacuum established in the cavity and the pressure on the plastic laminate 57. During the injection, the flow is regulated with the flow control valve 58, or in other ways, so that a controlled development of the fluid front 61 of the injected plastic laminate 62 is maintained with balance between regulated inflow and gravitation. Now because of the venting ducts 2 residual air 3 is allow to despite during injection. This results because the air is allowed to pass trough the outer side of the venting ducts 2 in opposite to the plastic laminate 57. Inside the venting ducts 2 the air is leaded for example by the breather filter 3 to the outside, which is shown by the arrow o. Therefore air inclusions are minimized or even avoided.

Figure 6:
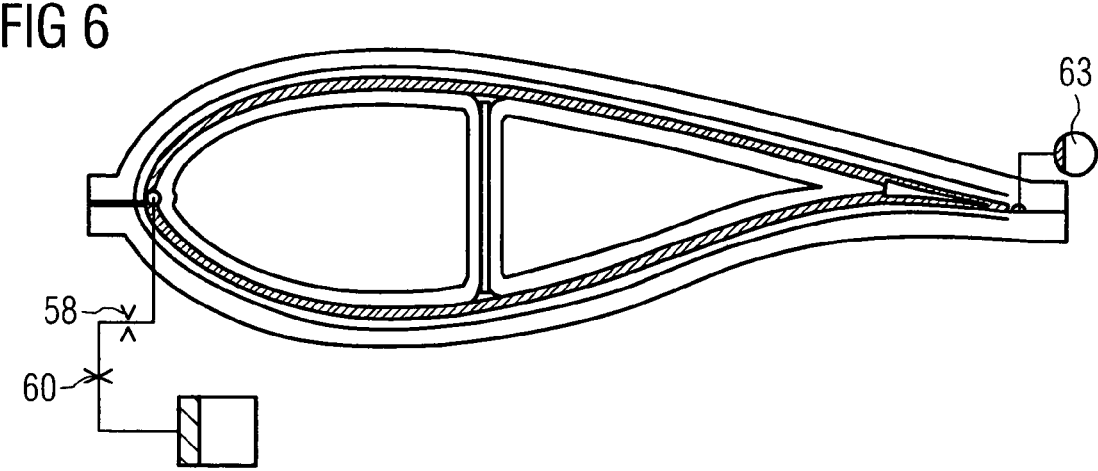
FIG. 6: shows schematically the finished rotor blade inside the moulds (longitudinal cut through rotor blade during casting).

FIG. 6 shows the next step in making rotor blades according to the invention. The flow front 61 has now reached the trailing edge of the rotor blade, and plastic laminate 57 now penetrates up into one or more overflow containers 63. The venting ducts 2 can as an example also end in the feed lines (not shown) of one of the overflow containers 63. When there is pure plastic laminate 57 in the relevant overflow containers, the injection is terminated by the stop cock 60, or in other ways. After finished setting, the moulds are opened and the finished rotor blade is taken out. By this method according to the invention it is possible to manufacture a rotor blade in one piece without the risk of large air inclusions.

Above there is described a practical embodiment of the method, where the fibre-reinforcement is laid in dry conditions, and where the plastic laminate is supplied by vacuum injection. In other practical embodiments, a so called prepeg is laid, where the fibre-reinforcement are impregnated with plastic laminate in advance, and which, after being applied vacuum, is brought to set by the action of heat, UV irradiation, or similar, or fibre-reinforcements that are combinations of temperature resisting fibre materials and thermoplastic may be laid, and where the fibre reinforcements after laying may be brought to a temperature where the thermoplastic material melts and thereby acts as resin in the finished laminate. Also in all this cases a venting duct can be applied with the above mentioned qualities. Also this invention can be applied to combination of these methods, or to each casting method which allows the use of such a venting duct. Also the location of the flow pipe is not restricted by the drawings.

The invention claimed is:

1. A method for casting a component, comprising:
   arranging a fibre-reinforcement in a casting mould for an at least partly fibre-reinforced plastic laminate;
   placing a venting duct at the component, wherein a surface of the venting duct is at least partially a semi-permeable membrane to allow a passage of a gas and to prevent a passage of plastic;
   wetting the fibre-reinforcement and the venting duct at least partly by a plastic during the casting process; and
   venting the gas through the venting duct,
   wherein a surface of the venting duct is resinophobic and retains unwetted areas at a macroscopic or microscopic level when wetted by plastics.

2. The method as claimed in claim 1, wherein the fibre-reinforced plastic laminate comprises of an upper surface and a lower surface, and wherein at least one venting duct is located close to the upper surface.

3. The method as claimed in claim 1, wherein at least two venting ducts are placed with a spacing inside the laminate.

4. The method as claimed in claim 1, wherein the component is a rotor blade.

5. The method as claimed in claim 1, wherein the component is a windmill rotor blade.

6. A component, comprising:
   a fibre-reinforced plastic laminate; and
   a venting duct in the plastic laminate, wherein a surface of the venting duct has a semi-permeable membrane to allow the passage of gas and to restrict totally a passage of plastics,
   wherein a surface of the venting duct is resinophobic and retains unwetted areas at a macroscopic or microscopic level when wetted by plastics.

7. The component as claimed in claim 6, wherein an interior of the venting duct facilitates passage of air in a longitudinal direction of the venting duct.

8. The component as claimed in claim 6, wherein at least two venting ducts are placed with a spacing inside the laminate.

9. The component as claimed in claim 6, wherein at least one venting duct ends in a manifold.

10. The component as claimed in claim 9, wherein at least one manifold is connected to an air extraction.

11. A windmill rotor blade, comprising:
    a fibre-reinforced plastic laminate; and
    a venting duct in the plastic laminate, wherein a surface of the venting duct has a semi-permeable membrane to allow the passage of gas and to prevent a passage of plastics,
    wherein a surface of the venting duct is resinophobic and retains unwetted areas at a macroscopic or microscopic level when wetted by plastics.

12. The blade as claimed in claim 11, wherein at least two venting ducts are placed with a spacing inside the laminate.

13. The blade as claimed in claim 11, wherein at least one venting duct ends in a manifold.

14. The blade as claimed in claim 11, wherein at least one manifold is connected an air extraction.

* * * * *